(12) United States Patent
Lee

(10) Patent No.: US 8,210,501 B2
(45) Date of Patent: Jul. 3, 2012

(54) INFLATION VALVE

(75) Inventor: William Lee, Taipei (TW)

(73) Assignee: Wuxi Deyang Industries Co., Ltd., Lake Tai Town, Wuxi, Jiangsu (CN)

( * ) Notice: Subject to any disclaimer, the term of this patent is extended or adjusted under 35 U.S.C. 154(b) by 404 days.

(21) Appl. No.: 12/483,772

(22) Filed: Jun. 12, 2009

(65) Prior Publication Data

US 2010/0313968 A1 Dec. 16, 2010

(51) Int. Cl.
*F16K 31/00* (2006.01)
(52) U.S. Cl. ........ 251/354; 251/92; 251/285; 137/15.18
(58) Field of Classification Search .......... 251/92, 251/95, 100, 112, 113, 115, 116, 285, 322, 251/323, 349, 354; 137/15.18, 230, 234.5, 137/315.27, 542, 543.13, 231
See application file for complete search history.

(56) References Cited

U.S. PATENT DOCUMENTS

| | | | | |
|---|---|---|---|---|
| 1,300,611 A | * | 4/1919 | Henemier | 251/354 |
| 1,825,562 A | * | 9/1931 | Tura | 137/223 |
| 1,899,506 A | * | 2/1933 | Hutt | 251/353 |
| 2,075,167 A | * | 3/1937 | Broecker | 137/234.5 |
| 2,855,946 A | * | 10/1958 | Mackal | 137/223 |
| 2,905,198 A | * | 9/1959 | Peeps et al. | 137/627.5 |
| 3,396,743 A | | 8/1968 | Mackal et al. | |
| 3,747,140 A | * | 7/1973 | Roberts | 405/186 |
| 3,825,222 A | * | 7/1974 | Petrova | 251/149.6 |
| 4,129,145 A | | 12/1978 | Wynn | |
| 4,176,681 A | | 12/1979 | Mackal | |
| 4,305,425 A | | 12/1981 | Mackal et al. | |
| 4,436,125 A | * | 3/1984 | Blenkush | 141/330 |
| 4,541,457 A | * | 9/1985 | Blenkush | 137/614.06 |
| 4,561,633 A | * | 12/1985 | Haiges | 251/339 |
| 4,836,235 A | | 6/1989 | Pagani | |
| 5,135,025 A | | 8/1992 | Mackal | |
| 5,297,576 A | | 3/1994 | Weinheimer | |
| 5,433,410 A | * | 7/1995 | Foltz | 251/100 |
| 5,606,989 A | * | 3/1997 | Roll et al. | 137/203 |
| 7,410,145 B1 | * | 8/2008 | Elze et al. | 251/100 |

* cited by examiner

*Primary Examiner* — John Fristoe, Jr.
*Assistant Examiner* — Matthew W Jellett
(74) *Attorney, Agent, or Firm* — Muncy, Geissler, Olds & Lowe, PLLC

(57) ABSTRACT

An inflation valve is revealed. The inflation valve includes a longitudinal valve body, a valve member and an elastic member sleeved between the valve member and the longitudinal valve body. The longitudinal valve body includes an axially extending hole disposed therein, a projecting edge arranged on the axially extending hole and a round through hole disposed on a center of the projecting edge, and two alignment members having at least one projecting body and/or one concave slot. A round valve head is arranged on the front end of the valve member and alignment members corresponding to the alignment members of the longitudinal valve body disposed on an outer edge of the valve head. While being assembled, the valve head passes the through hole by alignment of the alignment members between the valve member and the longitudinal valve body and becomes staggered. Moreover, by the elastic member, the valve head presses and locks onto the round through hole to form a closed state.

7 Claims, 6 Drawing Sheets

INFLATION VALVE

BACKGROUND OF THE INVENTION

The present invention relates to an inflation valve, especially to an inflation valve that allows air flowing into air bags such as life jackets or life rafts for inflation.

Generally an inflation valve is a one-way valve that includes a valve body and a valve member. The valve body is disposed with a channel and a valve seat while the valve member consists of a rod whose front end is connected with a valve head. The valve member is set in the channel and is passing the valve seat axially. The valve member moves forwards and backwards repeatedly so as to open or close the inflation valve.

Refer to U.S. Pat. No. 3,396,743, a checked valve for air intake and exhaust is revealed. The check valve includes a first and a second annular valve seats moveable relative to each other so that the production cost is high and the maintenance is poor.

Refer to U.S. Pat. No. 4,176,681 and U.S. Pat. No. 4,305,425, a oral inflation valve is disclosed. The valve has a valve body and a movable valve element therein. The valve element has a body which carries an annular sealing means. This device also has shortcomings of high production cost and poor maintenance.

Refer to U.S. Pat. No. 4,129,145, a check valve assembly having a hollow valve body is disclosed. A seal member (deformable resilient O-ring) circumscribes a poppet element at the neck of the poppet. The O-ring is pressed against a seating surface by fluid flowing through the valve body to close the valve. While once the pressure in the valve assembly is larger, the seal member is easily falling off due to the pressure so as to cause leakage of the fluid.

Refer to U.S. Pat. No. 4,836,235, a tire valve revealed includes an elastic valve body having a through passageway formed therein, with a constriction formed at an intermediate portion of the through passageway. A valve pin is provided with a gasket and is mounted to slide directly within the constriction at the intermediate portion of the through passageway. When the pressure in the valve becomes larger, the gas tightness is reduced once an enlarged head on the valve pin leans against inner wall of the valve body. Moreover, at least one of the valve pin and the valve body is made from elastic material and this is difficult to manufacture in practice.

Refer to U.S. Pat. No. 5,135,025, an articulated oral inflation valve is revealed. A valve stem of the valve has a trailing end in the form of a spherical ball and a socket carried by a valve head rotatably receives the ball. Yet the assembling of multiple components increases the production cost and the assembling is time consuming. Moreover, the defective rate of the products is quite high and the maintenance of products is difficult.

Refer to U.S. Pat. No. 5,297,576, an oral inflation and relief tube for connection to an inflatable article is disclosed. The structure is similar to the U.S. Pat. No. 4,305,425 so that this device also has disadvantages of high production cost and poor/difficult maintenance.

Thus the above prior arts are with several shortcomings such as complicated structure, high production cost, difficulties in assembling, poor or difficult maintenance, and insufficient strength of the whole structure. Moreover, when the pressure in the valve is larger, sealing members are easy to fall off or poor gas tightness is occurring. Thus there is a need to provide a new design of the inflation valve that makes the assembling become more convenient, improves the strength of the whole structure as well as the gas tightness, and further reduces the production cost.

SUMMARY OF THE INVENTION

Therefore it is a primary object of the present invention to provide an inflation valve that includes a longitudinal valve body, a valve member and an elastic member sleeved between the valve member and the longitudinal valve body. The longitudinal valve body includes an axially extending hole disposed therein, a projecting edge arranged in the axially extending hole and a round through hole disposed on a center of the projecting edge, and an alignment member having at least one projecting body and/or one concave slot arranged on an inner surface of the through hole. The valve member has a round valve head whose outer edge is disposed with an alignment member having at least one projecting body and/or one concave slot, corresponding to the alignment member arranged on the inner surface of the through hole of the longitudinal valve body. A valve stem is disposed on a rear end of the valve head. The rear end of the valve stem is connected with an air intake member that includes an axial hole connecting with the axially extending hole of the longitudinal valve body. While being assembled, the valve member inserts into the axially extending hole of the longitudinal valve body and the valve head moves forward to pass the through hole by the alignment member on the outer edge of the round valve head being aligned with the alignment member on the inner surface of the through hole of the longitudinal valve body. Then the two alignment members are in staggered positions so that the valve member is unable to go back through the through hole. Moreover, by the elastic member, the round valve head of the valve member presses and locks onto the round through hole of longitudinal valve body to form a closed state.

It is another object of the present invention to provide an inflation valve in which the round valve head presses firmly and attaches closely onto the round through hole of the longitudinal valve body by staggering and locking of the alignment members so as to improve strength of the whole structure.

DETAILED DESCRIPTION OF THE PREFERRED EMBODIMENT

Figure 1:
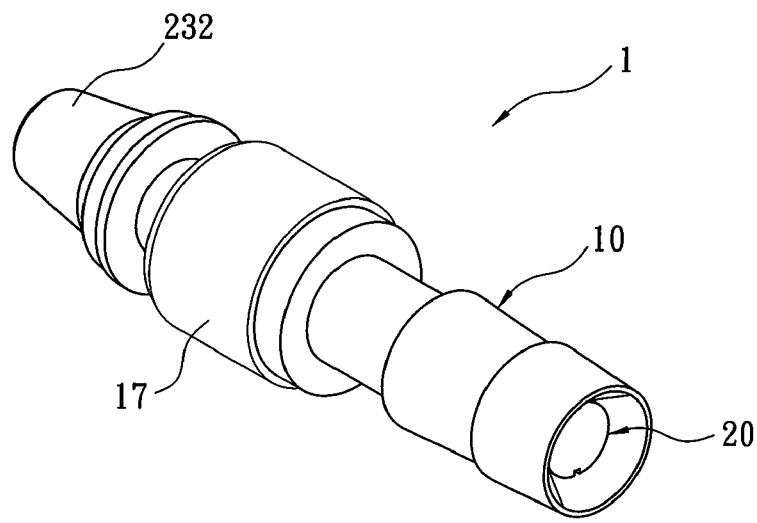
FIG. 1 is a perspective view of an embodiment according to the present invention.
Figure 2:
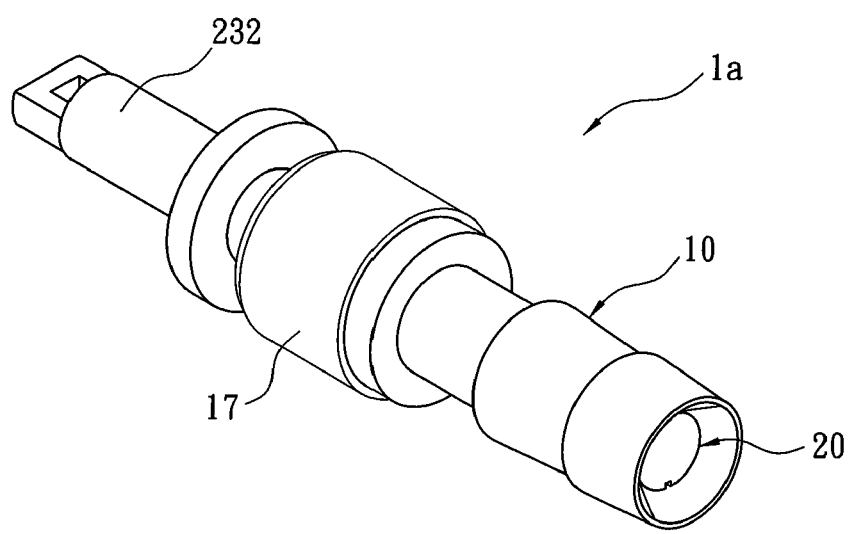
FIG. 2 is a perspective view of another embodiment according to the present invention.
Figure 3:
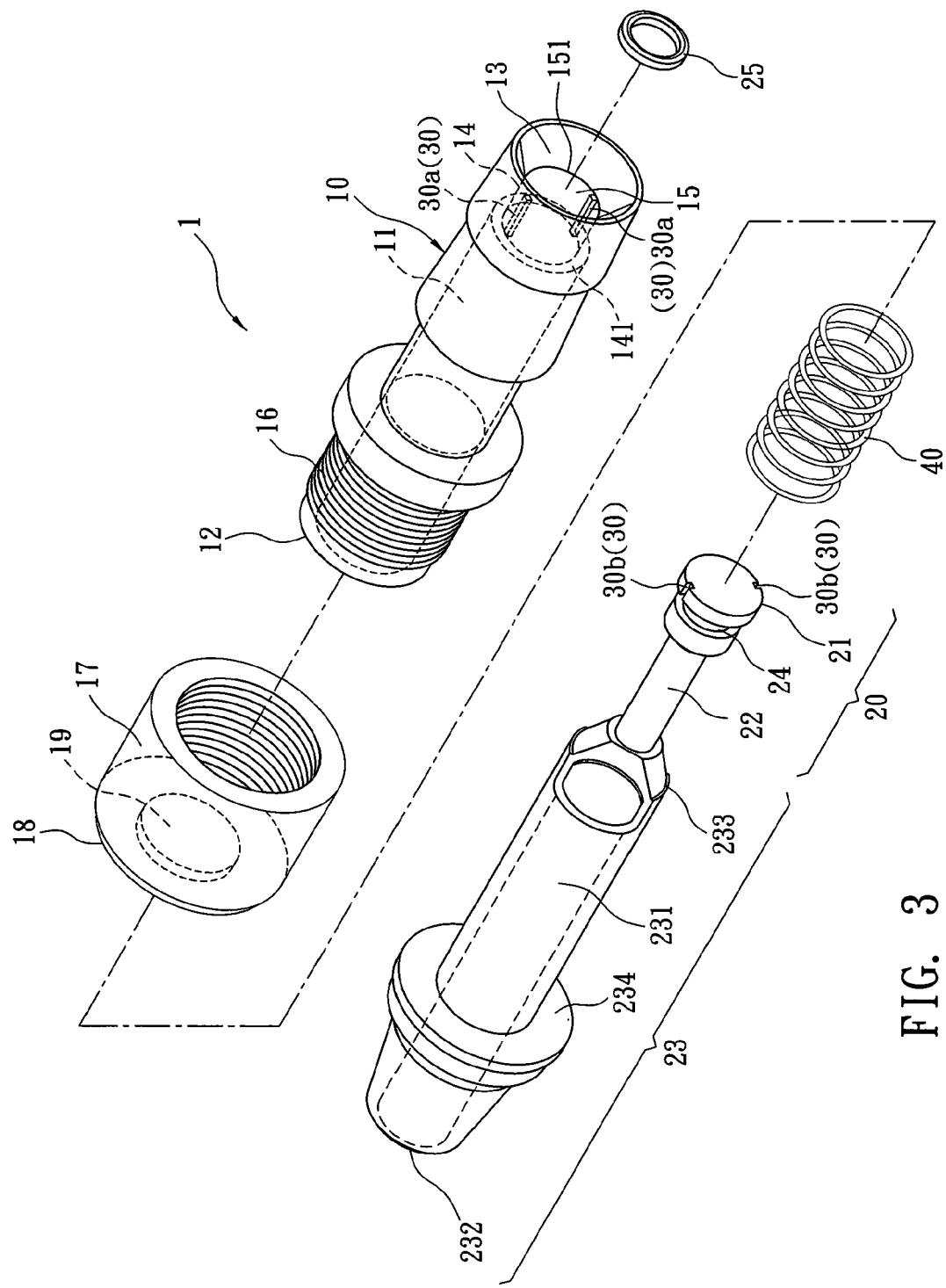
FIG. 3 is an explosive view of an embodiment according to the present invention.
Figure 6:
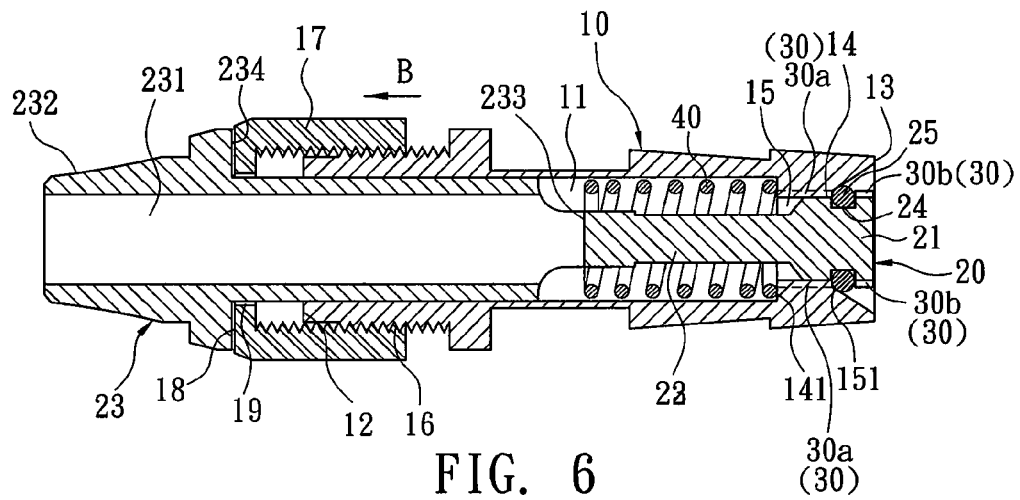
FIG. 6 is a cross sectional view of the embodiment in FIG. 4 in a closed state while a nut moving toward an input end so that the valve member is stopped according to the present invention.
Figure 15:
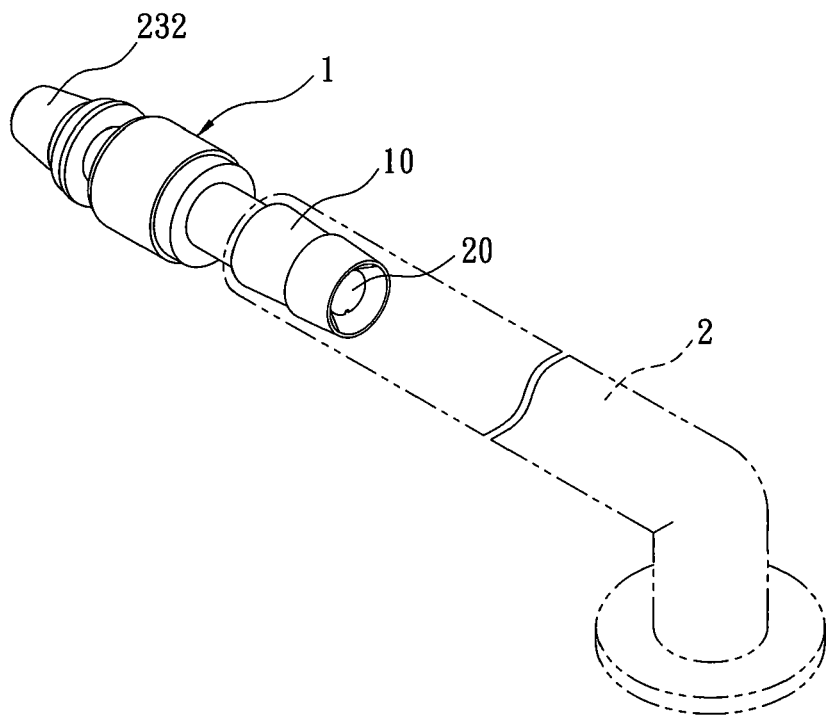
FIG. 15 is an embodiment of the present invention connected with a blow pipe in the use.

Refer from FIG. 1 to FIG. 4, an inflation valve 1 is designed with a check valve and is composed of a longitudinal valve body 10, a valve member 20, and an elastic member 40. The longitudinal valve body 10 is disposed with an axially extending hole 11 whose two ends are an input end 12 and an output end 13 respectively. A projecting edge 14 is arranged on the axially extending hole 11 (inner surface of the longitudinal valve body 10) and a round through hole 15 is disposed on a center of the projecting edge 14. The outer edge of the round through hole 15 is a top edge 151 while a divergent loop surface is formed between the top edge 151 and the output end 13. An alignment member 30 is disposed on the inner surface of the round through hole 15. The alignment member 30 includes at least one projecting part 30a and/or at least one concave slot 30b. As shown in FIG. 3, the inner surface of the round through hole 15 is arranged with at least one projecting member 30a, an outer surface of the output end 13 of the longitudinal valve body 10 is disposed with a step-like part so as to connect with a blow pipe 2, as shown in FIG. 15. An outer surface of the input end 12 of the longitudinal valve body 10 is disposed with a threaded part 16 and a corresponding nut 17 is provided and is threaded onto the threaded part 16. The nut 17 further consists of a top plate 18 with an insertion hole 19 in the center thereof so that an air intake member 23 can be inserted into the insertion hole 19. By rotation, the nut 17 moves toward the input end 12 and the top plate 18 leans against a flange surface 234 of the air intake member 23 so that a round valve head 21 of the valve member 20 is stopped on the top edge 151 of the longitudinal valve body 10, as shown in FIG. 6.

The valve member 20 includes the round valve head 21 whose rear end is disposed with a valve stem 22. The rear end of the valve stem 22 is connected with the air intake member 23. One end of the valve stem 22, near the round valve head 21, is disposed with a neck part 24 for being sleeved with a seal ring 25.

Figure 16:
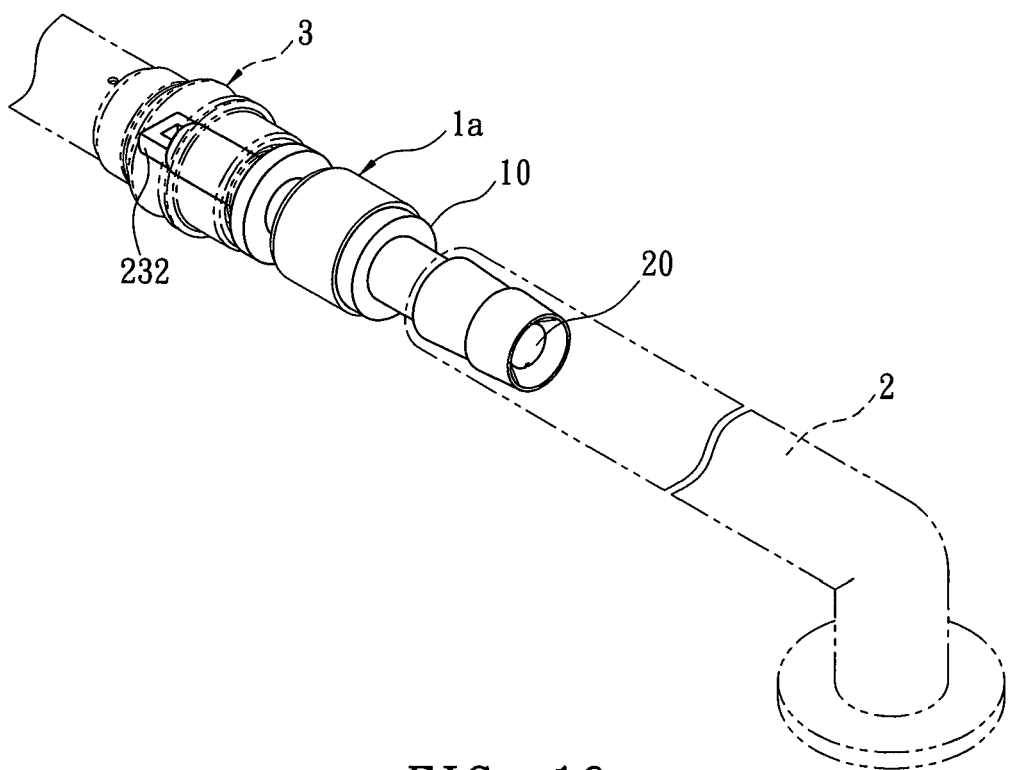
FIG. 16 is an embodiment of the present invention connected with a quick disconnect hose for scuba diving in the use.

The outer edge of the round valve head 21 is disposed with an alignment member 30 that consists of at least one projecting part 30a and/or at least one concave slot 30b, corresponding to the at least one projecting part 30a and/or at least one concave slot 30b of the alignment member 30 disposed on the inner surface of the round through hole 15. The air intake member 23 includes an axial hole 231 that connects with the axially extending hole 11 of the longitudinal valve body 10 and an air intake part 232 arranged on one end thereof while the other end of the air intake member 23 is connected with the rear end of the valve stem 22 so that fluid enters from the air intake part 232, through the axial hole 231 and then into the axially extending hole 11 of the longitudinal valve body 10. The air intake part 232 is further arranged with a stopping part 233 for stopping and against the elastic member 40. The valve member 20 and the air intake member 23 can be formed and integrated together by injection molding. The air intake part 232 is designed into various types (shapes) according to users' needs. For example, the air intake part 232 is in a tapered shape in which one end is with larger diameter while the other end is with smaller diameter so as to be occluded by the mouth of users for inflation. Or as shown in FIG. 2, the air intake part 232 is a slim cylinder that is suitable to be connected with a quick disconnect hose 3 for scuba diving to inflate the air bag, as shown in FIG. 16.

The alignment member 30 consists of at least one projecting part 30a and/or at least one concave slot 30b, respectively disposed on the inner surface of the round through hole 15 and the outer edge of the round valve head 21 of the valve member 20. The positions, sizes and shapes of the projecting part 30a and the concave slot 30b are not limited. The length of them is not restricted and the shape can be rectangular, triangular, trapezoid, arched or combinations of above shapes. As shown in FIG. 3, in this embodiment, two projecting bodies 30a are disposed on the surface of the through hole 15 of the longitudinal valve body 10 while two concave slots 30b are arranged on the outer edge of the round valve head 21 of the valve member 20 correspondingly so that the two concave slots 30b corresponds to the two projecting bodies 30a. The above two projecting bodies 30a and the two concave slots 30b can also be disposed in opposite positions. That means the two concave slots 30b are disposed on the longitudinal valve body 10 while two projecting bodies 30a are arranged on the valve member 20.

Figure 7:
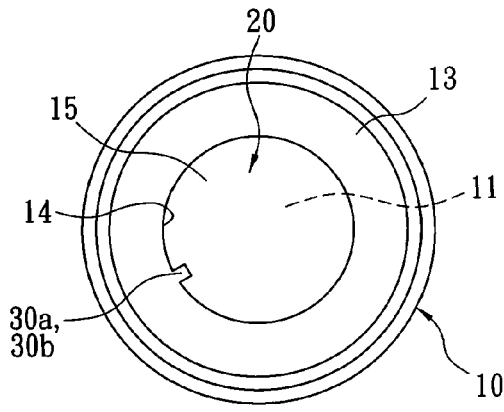
FIG. 7 to FIG. 12 respectively is a front view of at least one alignment member on an output end of various embodiments according to the present invention.
Figure 8:
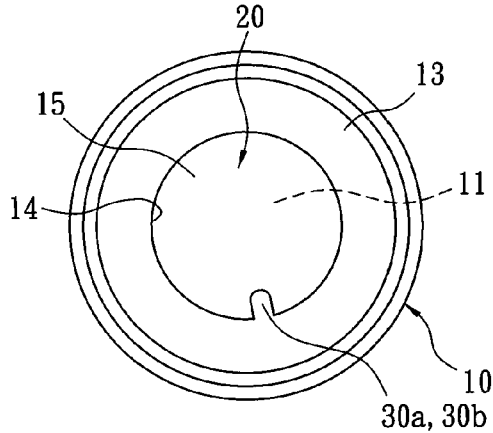
Figure 9:
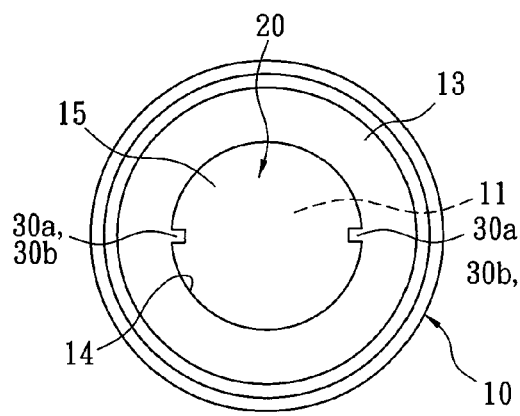
Figure 10:
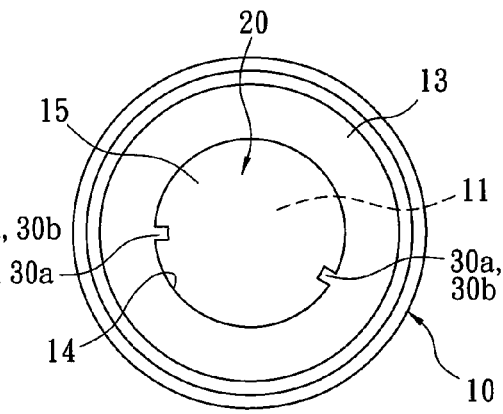
Figure 11:
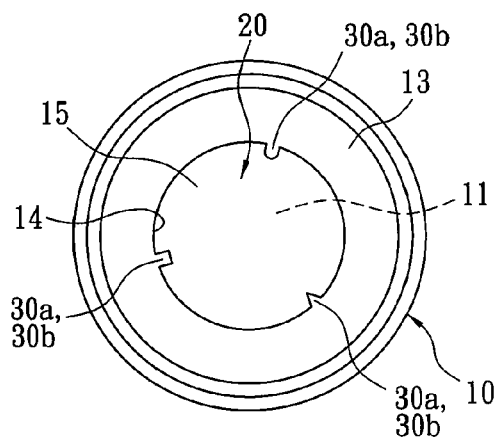
Figure 12:
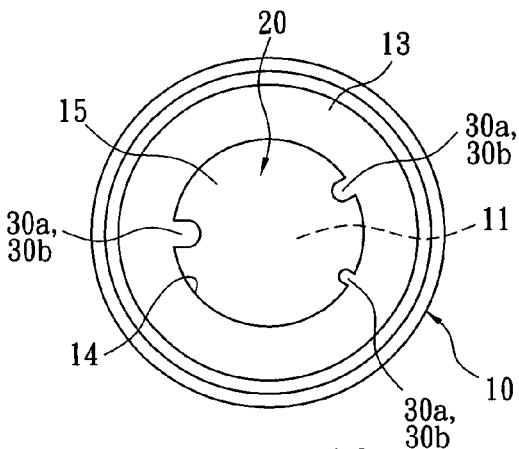

Moreover, refer to FIG. 7, the longitudinal valve body 10 and the valve member 20 respectively are disposed with a rectangular projecting body 30a and a rectangular concave slot 30b. As shown in FIG. 8, the shape and the positions of the projecting body 30a and those of the concave slot 30b are different from those of the embodiment in FIG. 7 and size of the projecting body 30a as well as the concave slot 30b is larger. Refer to FIG. 9, the two projecting bodies 30a with the same size and arranged symmetrically and the two corresponding concave slots 30b are shown. Refer to FIG. 10, the two projecting bodies 30a with the same size and arranged dissymmetrically, and the two corresponding concave slots 30b are shown. As shown in FIG. 11, three projecting bodies 30a with different shapes and arranged in a circle with the same angle between each other, and corresponding concave slots 30b are revealed. Refer to FIG. 12, three projecting bodies 30a with different sizes and arranged in a circle with unequal angle between each other, and corresponding concave slots 30b are revealed. Furthermore, the projecting body 30a and the corresponding concave slot 30b is further disposed with a bevel (slant angle) or arched surface (not shown in figure) on the front surface or the rear surface thereof so as to favor the alignment and corresponding between the projecting body 30a and the corresponding concave slot 30b. The front end of the alignment member 30 (projecting body 30a) of the longitudinal valve body 10 is disposed with the top edge 151 and a divergent surface is formed between the top edge 151 and the output end 13. The top edge 151 can be in an arched shape so as to increase gas tightness between the top edge 151 and the seal ring 25.

The elastic member 40 is a compression spring sleeved on the valve stem 22 of the valve member 20. One end of the elastic member 40 presses against a rear end surface 141 of the projecting edge 14 of the longitudinal valve body 10 while the other end thereof presses against the stopping part 233 of the air intake member 23.

Figure 4:
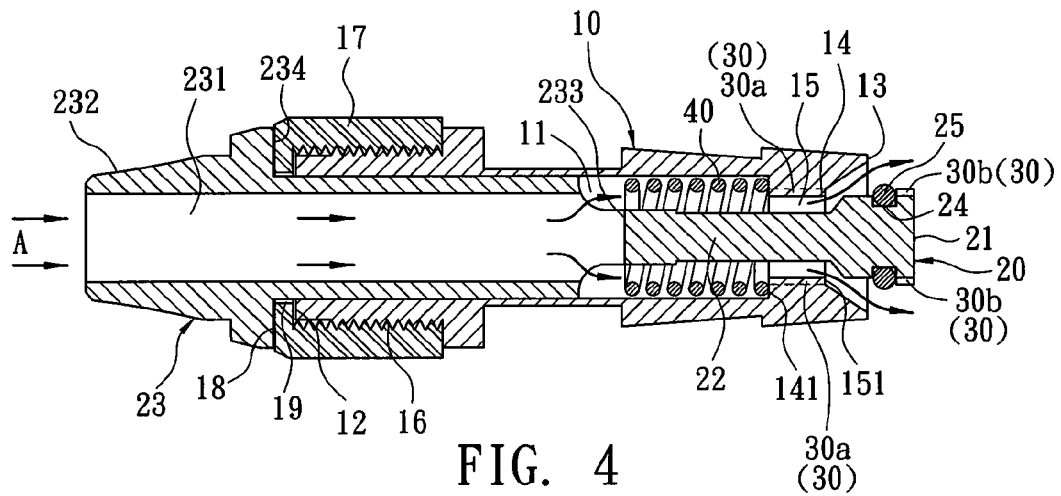
FIG. 4 is a cross sectional view of an embodiment in an open state according to the present invention.

Refer to FIG. 4, when the valve member 20 moves forward the output end 13 of the longitudinal valve body 10 axially (forward), the elastic member 40 is compressed and a circular passage is formed between the valve head 21 and the extending hole 11 of the longitudinal valve body 10. The fluid (indicated by the arrow A in figure) flows into the valve from the air intake part 232, through the an axial hole 231, into the axially extending hole 11 of the longitudinal valve body 10, and flows out of the output end 13. Thus the inflation valve 1 is in an open state.

Figure 5:
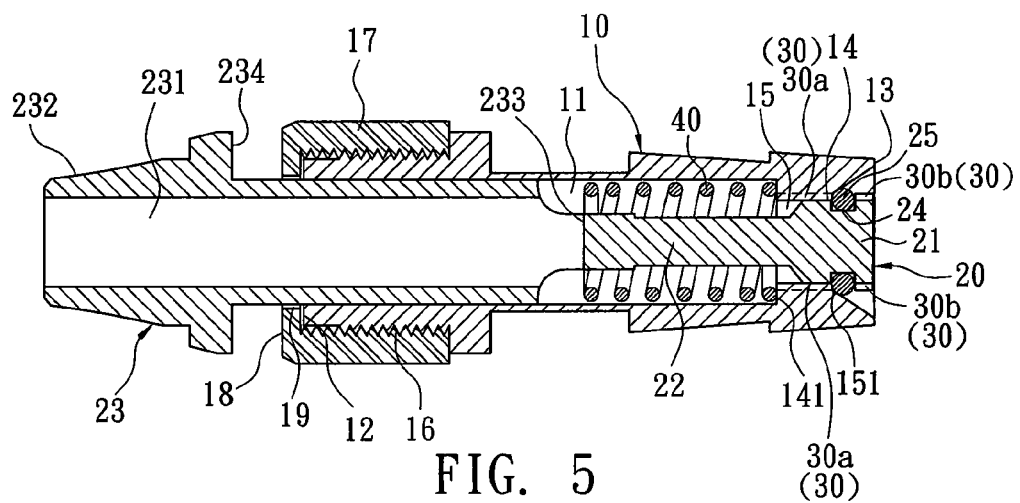
FIG. 5 is a cross sectional view of the embodiment in FIG. 4 in a closed state according to the present invention.

Refer to FIG. 5, by the elastic recovery force of the elastic member 40, the air intake member 23 is forced to move toward the input end 12 (backward) so that the seal ring 25 on the neck part 24 of the round valve head 21 locks with the top edge 151 on the round through hole 15 of the longitudinal valve body 10. Thus the inflation valve 1 is in a closed state.

Refer to FIG. 6, when the nut 17 is rotated, moved toward the input end 12 (as indicated by the arrow B in figure) and leaning against the flange surface 234 of the air intake member 23, the valve head 21 of the valve member 20 is stopped on the top edge 151 on the round through hole 15 of the longitudinal valve body 10. Now the seal ring 25 on the valve member 20 attaches on the surface of the top edge 151 closely.

Figure 13:
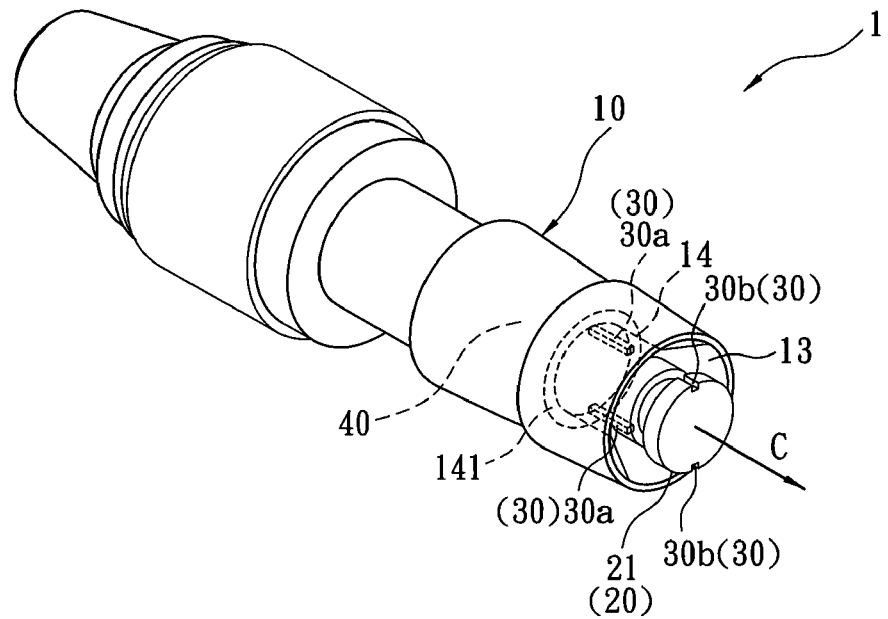
FIG. 13 and FIG. 14 are schematic drawings showing assembling of an embodiment according to the present invention.
Figure 14:
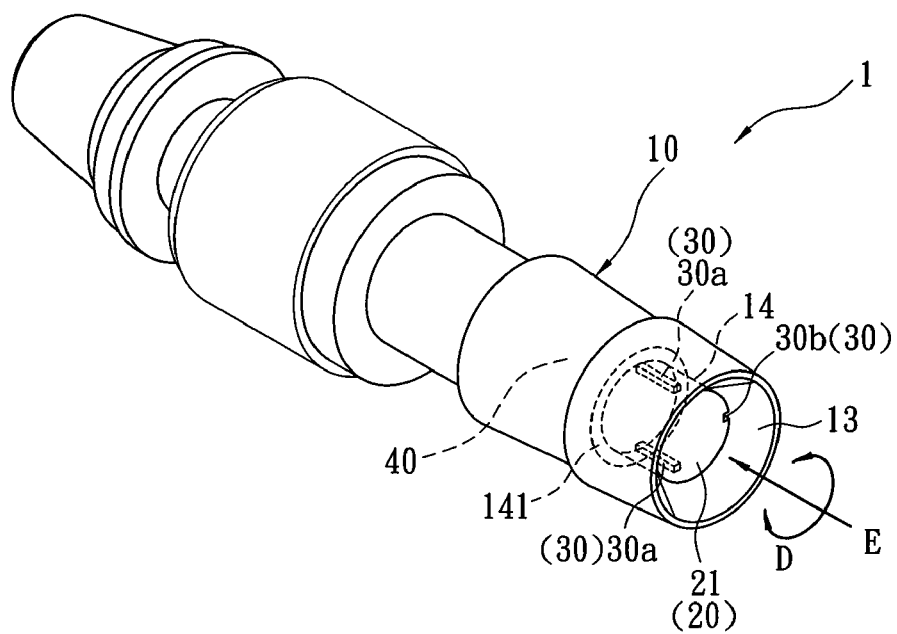

While being assembled, refer to FIG. 13 & FIG. 14, the valve member 20 is inserted into the axially extending hole 11 of the longitudinal valve body 10. Then by the alignment member 30 on the outer edge of the round valve head 21 of the valve member 20 being manually aligned with the alignment member 30 on the inner surface of the round through hole 15 of the longitudinal valve body 10, the valve head 21 passes the through hole 15, as shown by the arrow C in FIG. 13. Then refer to FIG. 14, the round valve head 21 is rotated by an angle, as shown by the arrow D in FIG. 14, so that the two alignment members 30 are in staggered positions. Thus the round valve head 21 of the valve member 20 is unable to turn back through the through hole 15 easily. Moreover, the round valve head 21 of the valve member 20 is pressed onto and locked with the round through hole 15 of the long valve body 10 by the elasticity of the elastic member 40 so that the inflation valve 1 is in a closed state. When the inflation valve 1 is going to be disassembled, the two alignment members 30 are manually aligned in opposite directions, the valve head 21 is turned back through the through hole 15 and moved out.

Refer to FIG. 15, the inflation valve 1 is further connected with a hollow object or an object with an air bag such as a life jacket or a life raft by a blow pipe 2. Then air is input into the air bag for inflation of the life jacket or the life raft. Refer to FIG. 16, another inflation valve 1a (as shown in FIG. 2) is connected with a quick disconnect hose 3 for scuba diving by the slim air intake part 232. Then air is flowing into the air bag by high pressure gas cylinders or flowers through the quick disconnect hose 3.

Compared with prior arts, the diameter of the round through hole 15 of the longitudinal valve body 10 of the inflation valve 1 according to the present invention is approximately equal to an outer diameter of the round valve head 21 of the valve member 20. By the staggered locking of the alignment members 30, the structure strength after assembling is improved. In use, the inflation valve 1 stands higher inner pressure. Moreover, the structure is simple so that the assembling is precise and fast. Thus the efficiency of the inflation valve 1 is enhanced.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An inflation valve comprising:
   a longitudinal valve body having an axially extending hole disposed therein, a projecting edge arranged in the axially extending hole, a round through hole disposed on a center of the projecting edge, and an alignment member formed by at least one projecting body and/or one concave slot arranged on an inner surface of the through hole;
   a valve member mounted in the axially extending hole of the longitudinal valve body having a valve head whose rear end is disposed with a valve stem connected with an air intake member; the air intake member having an axial hole connecting with the axially extending hole of the longitudinal valve body; the valve head arranged with a neck part for being sleeved with a seal ring while the valve member together with air intake member are formed integratedly; wherein an alignment member is disposed on an outer edge of the valve head and having at least one projecting body and/or one concave slot corresponding to the alignment member on the inner surface of the through hole of the longitudinal valve body; and
   an elastic member sleeved on the valve stem of the valve member while one end of the elastic member presses against a rear end surface of the projecting edge of the longitudinal valve body and the other end thereof presses against a stopping part of the air intake member of the valve member; wherein while being assembled, the valve member inserts into the axially extending hole of the longitudinal valve body and the valve head moves forward to pass the through hole by the alignment member on the outer edge of the round valve head of the valve member being aligned with the alignment member on the through hole of the longitudinal valve body; the valve head is rotated by an angle so as to make two alignment members in staggered positions for finishing the assembling; by elasticity of the elastic member, the valve head of the valve member presses and locks onto the round through hole of longitudinal valve body tightly and the inflation valve is in a closed state; while being disassembled, the two alignments are rotationally aligned so that the valve head is turned back and moved out of the through hole.

2. The device as claimed in claim 1, wherein a shape of the projecting body and of the concave slot of the alignment member is rectangular, triangular, trapezoid, arched or combinations of above shapes.

3. The device as claimed in claim 1, wherein the through hole is disposed with a top edge while a divergent loop surface is formed between the top edge and the output end of the longitudinal valve body.

4. The device as claimed in claim 1, wherein the longitudinal valve body includes an input end while an outer surface of the input end is disposed with a threaded part and a corresponding nut is disposed onto the threaded part.

5. The device as claimed in claim 1, wherein an air intake part is arranged on one end of the air intake member.

6. The device as claimed in claim 5, wherein the air intake part is in a tapered shape in which one end is with larger diameter while the other end is with smaller diameter so as to be occluded for inflation.

7. The device as claimed in claim 5, wherein the air intake part is a slim cylinder that is connected with a quick disconnect hose for scuba diving.

\* \* \* \* \*